(12) United States Patent
Yukizaki et al.

(10) Patent No.: US 9,246,531 B2
(45) Date of Patent: Jan. 26, 2016

(54) WIRELESS COMMUNICATION DEVICE

(71) Applicant: DENSO CORPORATION, Kariya, Aichi-pref. (JP)

(72) Inventors: Yasumune Yukizaki, Okazaki (JP); Tadao Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/436,983

(22) PCT Filed: Sep. 26, 2013

(86) PCT No.: PCT/JP2013/005704
§ 371 (c)(1),
(2) Date: Apr. 20, 2015

(87) PCT Pub. No.: WO2014/068843
PCT Pub. Date: May 8, 2014

(65) Prior Publication Data
US 2015/0288402 A1    Oct. 8, 2015

(30) Foreign Application Priority Data
Oct. 31, 2012  (JP) .................................. 2012-240355

(51) Int. Cl.
*H04B 1/40* (2015.01)
*H04B 1/3822* (2015.01)
*H04W 4/04* (2009.01)
*H04W 52/02* (2009.01)
*H03B 1/04* (2006.01)

(52) U.S. Cl.
CPC ............... *H04B 1/3822* (2013.01); *H03B 1/04* (2013.01); *H04W 4/046* (2013.01); *H04W 52/0283* (2013.01)

(58) Field of Classification Search
CPC ............. G01R 31/2824; G01R 23/005; H04B 17/309; H02H 3/50

USPC .......................................................... 455/85
See application file for complete search history.

(56) References Cited

U.S. PATENT DOCUMENTS

2006/0242463 A1    10/2006   Yasui et al.
2011/0057735 A1*    3/2011   Honda ...................... G06F 1/04
                                                           331/57

FOREIGN PATENT DOCUMENTS

| JP | 2006275700 A | 10/2006 |
| JP | 2008124685 A | 5/2008 |
| JP | 2010045514 A | 2/2010 |
| JP | 2011015359 A | 1/2011 |
| WO | WO-2012144629 A1 | 10/2012 |

OTHER PUBLICATIONS

International Search Report and Written Opinion (in Japanese with English Translation) for PCT/JP2013/005704, mailed Nov. 5, 2013; ISA/JP.

* cited by examiner

*Primary Examiner* — Eugene Yun
(74) *Attorney, Agent, or Firm* — Harness, Dickey & Pierce, P.L.C.

(57) ABSTRACT

A wireless communication device including a communication controller, a transmitter, an antenna and a receiver is provided. The wireless communication device further includes a current detector detecting a current consumption value of a power supply generator, a non-volatile memory pre-storing multiple current thresholds corresponding to multiple operating states, and an abnormal oscillation detector detecting abnormal oscillation by comparing the current consumption value acquired from the current detector and a current threshold corresponding to a present operating state of the wireless communication device out of the current threshold stored in the non-volatile memory.

6 Claims, 4 Drawing Sheets

| TX-RX WAITING STATE ABNORMAL OSCILLATION THRESHOLD (I TXRXwait_th) | 500mA |
|---|---|
| TX WAITING STATE ABNORMAL OSCILLATION THRESHOLD (I TXwait_th) | 500mA |
| RX WAITING STATE ABNORMAL OSCILLATION THRESHOLD (I RXwait_th) | 480mA |
| TX TIME ABNORMAL OSCILLATION THRESHOLD (I TX_th) | 1000mA |
| RX TIME ABNORMAL OSCILLATION THRESHOLD (I RX_th) | 510mA |

# WIRELESS COMMUNICATION DEVICE

CROSS-REFERENCE TO RELATED APPLICATIONS

This application is a U.S. National Phase Application under 35 U.S.C. 371 of International Application No. PCT/JP2013/005704 filed on Sep. 26, 2013 and published in Japanese as WO 2014/068843 A1 on May 8, 2014. This application is based on and claims the benefit of priority from Japanese Patent Application No. 2012-240355, filed on Oct. 31, 2012. The entire disclosures of all of the above applications are incorporated herein by reference.

TECHNICAL FIELD

The present disclosure relates to a wireless communication device including a transmitter and a receiver that process signals in a wireless frequency band.

BACKGROUND ART

In recent years, a wireless communication device mounted in, for example, a vehicle is configured such that a transmitter and a receiver for signal processing in a wireless frequency band are integrated into one body in order to achieve a size reduction. When a transmitter and a receiver are integrated into one body, the transmitter and the receiver may be electrically coupled in a high frequency component and may oscillate abnormally. Moreover, because amplifiers with high amplification factors are used in the transmitter and the receiver for the sake of power amplification, a signal on an output side of the transmitter or receiver may reach an input side and oscillate abnormally. A proposed method of detecting this kind of abnormal oscillation includes determining abnormal oscillation based on a preset threshold and an input level of a radio wave, which is from the exterior and received by an antenna (refer to PTL 1).

PRIOR ART LITERATURE

Patent Literature

PTL 1: Japanese Patent No. 2011-15359

SUMMARY OF INVENTION

However, in PTL 1, because abnormal oscillation is determined from the reception state of a radio wave from the exterior, abnormal oscillation cannot be detected unless a radio wave is received. Because of this, there is a problem in that abnormal oscillation occurring other than when receiving, for example, abnormal oscillation occurring in a transmission and reception waiting state, cannot be detected.

The present disclosure is made in view of the heretofore described situation and has an object to provide a wireless communication device capable of detecting abnormal oscillation even in an operating state in which no radio wave from the exterior is being received.

A wireless communication device according to an example of the present disclosure comprises a communication controller, a transmitter, an antenna, a receiver, a power supply generator, a current detector, a non-volatile memory, and an abnormal oscillation detector. The communication controller controls signal transmission and reception in wireless communication. The transmitter modulates and power-amplifies a signal from the communication controller. The antenna communicates with an exterior in a wireless frequency band. The receiver power-amplifies and demodulates a signal in the wireless frequency band received by the antenna and outputs the power-amplified and demodulated signal to the communication controller. The power supply generator supplies power to the communication controller, the transmitter, and the receiver. The current detector detects a current consumption value of the power supply generator. The non-volatile memory pre-stores a plurality of current thresholds corresponding to a plurality of operating states. The abnormal oscillation detector detects abnormal oscillation by comparing the current consumption value acquired from the current detector and a current threshold corresponding to a present operating state stored in the non-volatile memory.

According to this wireless communication device, when the wireless communication device oscillates abnormally, current consumption of the wireless communication device increases beyond normal. Thus, when the current consumption value is greater than an abnormal oscillation threshold corresponding to the present operating state, it is determined that abnormal oscillation has occurred. Because of this, abnormal oscillation can be detected even in an operating state in which no radio wave from the exterior is being received.

BRIEF DESCRIPTION OF DRAWINGS

The above and other objects, features, and advantages will be more apparent from the following detailed description made with reference to the accompanying drawings. In the drawings.

EMBODIMENTS FOR CARRYING OUT INVENTION

First Embodiment

Referring to FIG. 1 to FIG. 4, a first embodiment will be described in which a wireless communication device is applied to and used in a vehicle-vehicle wireless communication system.

Figure 1:
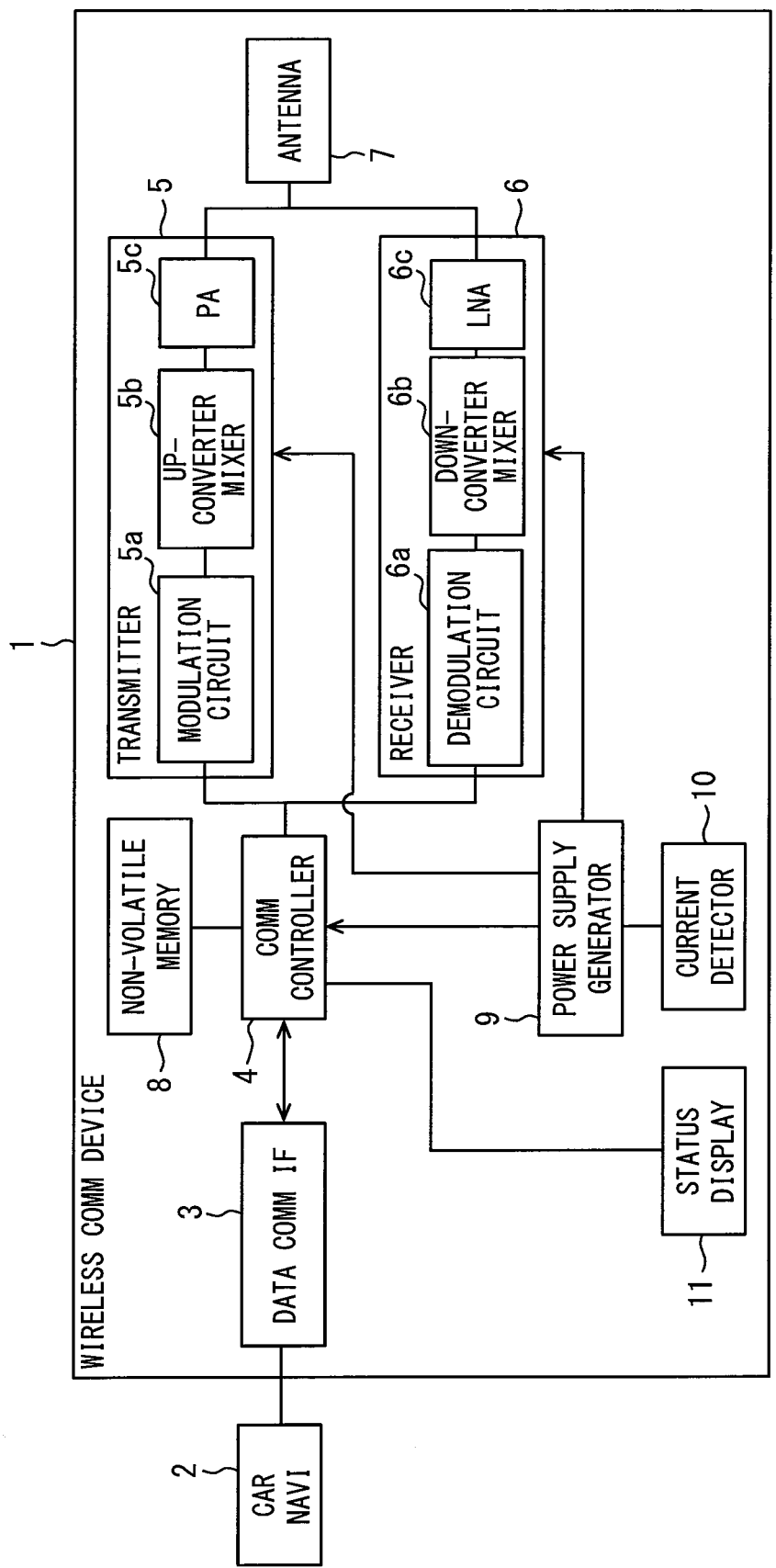
FIG. 1 is a functional block diagram illustrating a wireless communication device in a first embodiment.

In FIG. 1, a wireless communication device 1 is connected to a car navigation device (hereafter, car navigation) 2 acting as an external apparatus, and exchanges vehicle information with a wireless communication device 1 mounted in another vehicle positioned in the periphery (for example, within 100 m) of a subject vehicle. The vehicle information includes a present position, travel direction, vehicle speed, and the like, which are calculated by a communication controller 4. The car navigation 2, by acquiring the vehicle information mounted in another vehicle, warns of the existence of a vehicle positioned in the periphery of the subject vehicle, particularly the existence of a vehicle travelling in a region whose visibility in a rear view mirror is uncertain, or of the existence of another vehicle approaching a blind corner determined based on map information, or the like, using voice and visual display.

The wireless communication device 1 includes a data communication interface 3, the communication controller 4 (corresponding to an abnormal oscillation detector), a transmitter 5, a receiver 6, an antenna 7, a non-volatile memory 8, a power supply generator 9, a current detector 10, a status display 11, and the like.

The communication controller 4 outputs the vehicle information to the transmitter 5 after carrying out a conversion of the vehicle information to a wireless communication format, or the like.

The transmitter 5 includes a modulation circuit 5a, an up-converter mixer 5b, a PA (power amplifier) 5c, and the like. The transmitter 5 outputs an input signal to the antenna 7 after carrying out modulation in the modulation circuit 5a, up-conversion in the up-converter mixer 5b, and power amplification in the PA 5c. Because of this, the vehicle information of the subject vehicle is transmitted to a wireless communication device 1 mounted in a vehicle positioned in the periphery of the subject vehicle.

The receiver 6 includes an LNA (low noise amplifier) 6c, a down-converter mixer 6b, a demodulation circuit 6a, and the like. The receiver 6 controls the power of a radio wave received by the antenna 7 in the LNA 6c, down-converts the radio wave in the mixer, and demodulates the radio wave in the demodulation circuit 6a. The communication controller 4 converts a signal received with the receiver 6 to a cable communication format or the like and outputs the received signal to the car navigation 2 via the data communication interface 3. Because of this, the car navigation 2 receives the vehicle information from the wireless communication device 1 mounted in another vehicle positioned in the periphery of subject vehicle, and warns the driver in accordance with the vehicle information.

Signals in a wireless frequency band are provided from an unshown local oscillator to the up-converter mixer 5b and the down-converter mixer 6b. Also, the input sides and the output sides of the transmitter 5 and the receiver 6 are connected to the communication controller 4 and the antenna 7 via an unshown shared circuit.

The power supply generator 9 supplies power to each component constituting the wireless communication device 1. In FIG. 1, only power supply lines to the communication controller 4, the transmitter 5, and the receiver 6 are shown. The current detector 10 detects consumption of current supplied to each component from the power supply generator 9. The communication controller 4 acquires the consumption of current detected by the current detector 10. Also, the communication controller 4 is capable of controlling the supply of power to the transmitter 5 and the receiver 6 by turning each of power supply lines from the power supply generator 9 to the transmitter 5 and the receiver 6 on and off.

Herein, the communication controller 4 includes a function of detecting abnormal oscillation based on the consumption of current acquired from the current detector 10. An abnormal oscillation threshold to be compared with the consumption of current is stored in the non-volatile memory 8.

Figures 2, 3:
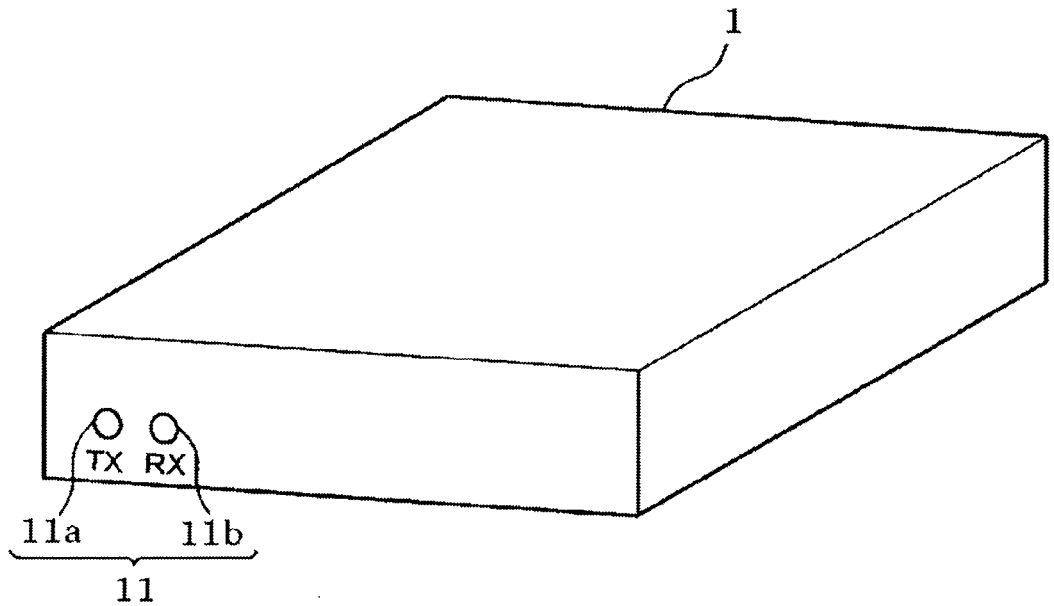
FIG. 2 is a perspective view of the wireless communication device.
FIG. 3 is a diagram illustrating abnormal oscillation thresholds corresponding to each state.

That is, as shown in FIG. 3, a transmission and reception waiting state, a transmission waiting state, a reception waiting state, a transmission time, and a reception time are set as operating states of the wireless communication device 1. A transmission and reception waiting state abnormal oscillation threshold I TXRXwait_th, a transmission waiting state abnormal oscillation threshold I TXwait_th, a reception waiting state abnormal oscillation threshold I RXwait_th, a transmission time abnormal oscillation threshold I TX_th, and a reception time abnormal oscillation threshold I RX_th are set as abnormal oscillation thresholds for detecting abnormal oscillation in respective operating states. That is, when abnormal oscillation occurs, the consumption of current increases beyond normal due to the abnormal oscillation. Thus, abnormal oscillation can be detected by detecting that a current consumption value is greater than the abnormal oscillation threshold. In this regard, the consumption of current when abnormal oscillation occurs differs in accordance with the operating state of the wireless communication device 1 (the transmission and reception waiting state, transmission waiting state, reception waiting state, transmission time, or reception time). Therefore, the abnormal oscillation thresholds are set individually corresponding to respective operating states.

The communication controller 4 detects abnormal oscillation by comparing the current consumption value detected by the current detector 10 with the abnormal oscillation threshold that is stored in the non-volatile memory 8 and that corresponds to the present operating state (the transmission and reception waiting state, transmission waiting state, reception waiting state, transmission time, or reception time). Further, when abnormal oscillation is detected, the communication controller 4 switches the operating state, and displays the present operating state using the status display 11.

The status display 11 includes a TX (transmission) LED 11a and an RX (reception) LED 11b provided on a side surface of the wireless communication device 1, as shown in FIG. 2. The TX LED 11a lights up when the transmitter 5 is operating (including a waiting state), while the RX LED 11b lights up when the receiver 6 is operating (including a waiting state). Both the TX LED 11a and the RX LED 11b light up when both the transmitter 5 and the receiver 6 are operating.

Herein, as the transmitter 5 and the receiver 6 process signals in a wireless frequency band, the transmitter 5 and the receiver 6 may be in an electrically coupled state in a high frequency component, and may oscillate abnormally. Also, as the PA 5c of the transmitter 5 and the LNA 6c of the receiver 6 are amplifiers with high amplification factors for the sake of power amplification, an output signal of the transmitter 5 or receiver 6 may reach the input side and oscillate abnormally. Because there is a possibility that the abnormal oscillation occurs in any of the heretofore described operating states of the wireless communication device 1, abnormal oscillation is detected for each operating state of the wireless communication device 1 in this embodiment.

Next, referring to FIG. 4, a description will be given of an abnormal oscillation detection method.

When the power supply of the wireless communication device 1 is turned on, the communication controller 4 carries out initialization (S101). After the initialization ends, the wireless communication device 1 temporarily enters the transmission and reception waiting state. Next, the communication controller 4 acquires a current consumption value I TXRXwait from the current detector 10 (S102). The communication controller 4 compares the I TXRXwait with the transmission and reception waiting state abnormal oscillation threshold I TXRXwait_th stored in the non-volatile memory 8 (S103). When I TXRXwait_th≥I TXRXwait (S103: NO), no abnormal oscillation is occurring. In this case, the communication controller 4 properly shifts the operating state of the wireless communication device 1 to the transmission and reception waiting state, wherein both the transmitter 5 and the receiver 6 are permitted to operate (S104). At this time, both the TX LED 11a and the RX LED 11b light up, so that the user can confirm that transmission and reception are enabled.

In the transmission and reception waiting state, the communication controller 4 determines whether transmission is in progress (S105: NO) or reception is in progress (S110: NO). When transmission is in progress in the transmission and reception waiting state (S105: YES), the communication controller 4 acquires a current consumption value I TX from the current detector 10 (S106), and compares the I TX and the transmission time abnormal oscillation threshold I TX_th stored in the non-volatile memory 8 (S107). When I TX_th≥I TX (S107: NO), no abnormal oscillation is occurring. In this case, the communication controller 4 determines whether the transmission is completed (S108: NO). When the transmission is completed (S108: YES), the communication controller 4 returns the operating state of the wireless communication device 1 to the transmission and reception waiting state (S104). Meanwhile, when I TX_th<I TX (S107: YES), abnormal oscillation is occurring when transmitting. In this case, the communication controller 4, after turning off the power supply of the transmitter 5 (S109), shifts the operating state of the wireless communication device 1 to the below-described reception waiting state (S118). At this time, the TX LED 11a is turned off and only the RX LED 11b is lighting, because of which the user can confirm that only reception is enabled.

When reception is in progress in the transmission and reception waiting state (S110: YES), the communication controller 4 acquires a current consumption value I RX from the current detector 10 (S111), and compares the I RX and the reception time abnormal oscillation threshold I RX_th stored in the non-volatile memory 8 (S112). When I RX_th≥I RX (S112: NO), no abnormal oscillation is occurring. In this case, the communication controller 4 determines whether the reception is completed (S113: NO). When the reception is completed (S113: YES), the communication controller 4 returns the operating state of the wireless communication device 1 to the transmission and reception waiting state (S104). Meanwhile, when I RX_th<I RX (S112: YES), abnormal oscillation is occurring. In this case, the communication controller 4, after turning off the power supply of the receiver 6 (S114), shifts the operating state of the wireless communication device 1 to the transmission waiting state, to be described hereafter (S127). At this time, the RX LED 11b is turned off and only the TX LED 11a lights up, because of which the user can confirm that only transmission is enabled.

When I TXRXwait_th<I TXRXwait (S103: YES), the communication controller 4 determines that abnormal oscillation is occurring. In this case, the communication controller 4 turns off the power supply of the transmitter 5 (S115). Next, the communication controller 4 acquires a current consumption value I RXwait from the current detector 10 (S116), and compares the I RXwait and the reception waiting state abnormal oscillation threshold I RXwait_th stored in the non-volatile memory 8 (S117). When I RXwait_th≥I RXwait (S117: NO), no abnormal oscillation is occurring when the receiver 6 is in the waiting state, meaning that the transmitter 5 is a factor in the abnormal oscillation. In this case, the communication controller 4 shifts the operating state of the wireless communication device 1 to the reception waiting state (S118). Steps S115 to S117 correspond to a first process.

The communication controller 4 determines whether reception is in progress in the reception waiting state (S119: NO). When reception is in progress (S119: YES), the communication controller 4 acquires the current consumption value I RX from the current detector 10 (S120), and compares the I RX and the reception time abnormal oscillation threshold I RX_th stored in the non-volatile memory 8 (S121). When I RX_th≥I RX (S121: NO), no abnormal oscillation is occurring when receiving. In this case, the communication controller 4 determines whether the reception is completed (S122: NO). When the reception is completed (S122: YES), the communication controller 4 returns the operating state of the wireless communication device 1 to the reception waiting state (S118). Meanwhile, when I RX_th<I RX (S121: YES), abnormal oscillation is occurring when receiving, and the normal operation of the wireless communication device 1 cannot be expected. In this case, the communication controller 4 turns off the power supply of the receiver 6 as well as that of the transmitter 5 (S123). At this time, the RX LED 11b is extinguished in addition to the TX LED 11a, because of which the user can confirm that neither transmission nor reception is possible.

When I RXwait_th<I RXwait (S117: YES), the communication controller 4 determines that abnormal oscillation is occurring when only the receiver 6 is in the waiting state. In this case, the communication controller 4 turns on the power supply of the transmitter 5 and turns off the power supply of the receiver 6 (S124), and determines whether abnormal oscillation is occurring in a waiting state of only the transmitter 5. That is, the communication controller 4 acquires a current consumption value I TXwait from the current detector 10 (S125), and compares the I TXwait and the transmission waiting state abnormal oscillation threshold I TXwait_th stored in the non-volatile memory 8 (S126). When I TXwait_th≥I TXwait (S126: NO), no abnormal oscillation is occurring when only the transmitter 5 is in the waiting state. In this case, the communication controller 4 shifts the operating state of the wireless communication device 1 to the transmission waiting state (S127). Steps S124 to S126 correspond to a second process.

The communication controller 4 determines whether transmission is in progress in the transmission waiting state (S128: NO). When transmission is in progress (S128: YES), the communication controller 4 acquires the current consumption value I TX from the current detector 10 (S129), and compares the I TX and the reception time abnormal oscillation threshold I TX_th stored in the non-volatile memory 8 (S130). When I TX_th≥I TX (S130: NO), no abnormal oscillation is occurring. In this case, the communication controller 4 determines whether the transmission is completed (S131: NO). When the transmission is completed (S131: YES), the communication controller 4 returns the operating state of the wireless communication device 1 to the transmission waiting state (S127). Meanwhile, when I TX_th<I TX (S130: YES), abnormal oscillation is occurring when transmitting, and the normal operation of the wireless communication device 1 cannot be expected. In this case, the communication controller 4 turns off the power supply of the transmitter 5 in addition to that of the receiver 6 (S123). At this time, the TX LED 11a is extinguished in addition to the RX LED 11b, because of which the user can confirm that neither transmission nor reception is possible.

When I TXwait_th<I TXwait (S126: YES), abnormal oscillation is also occurring when only the transmitter 5 is in the waiting state, and the transmitter 5 is also a factor in the abnormal oscillation in addition to the receiver 6, and the normal operation of the wireless communication device 1 cannot be expected. Accordingly, the communication controller 4 turns off the power supply of the transmitter 6 in addition to that of the receiver 6 (S132). At this time, the TX LED 11a is extinguished in addition to the RX LED 11b, because of which the user can confirm that neither transmission nor reception is possible.

According to this embodiment, the following advantages can be achieved.

In any operating states, the communication controller 4 can determine that abnormal oscillation has occurred when the current consumption value acquired by the current detector 10 is greater than the abnormal oscillation threshold corresponding to the present operating state. Therefore, abnormal oscillation can be detected even in an operating state in which no radio wave from the exterior is being received.

When the communication controller 4 determines that abnormal oscillation has occurred in the transmission and reception waiting state, the communication controller 4 checks the presence and absence of the abnormal oscillation while only one of the transmitter 5 or receiver 6 is in the waiting state. One of the transmitter 5 or receiver 6 without involving the abnormal oscillation is maintained in operation. Because of this, when only the transmitter 5 is in the waiting state, the vehicle information of subject vehicle can be sent to another vehicle. When only the receiver 6 is in the waiting state, the vehicle information from another vehicle can be received. Consequently, even when abnormal oscillation occurs due to part failure, design defect, or the like, one of the transmitter 5 or receiver 6 of the wireless communication device 1 is permitted to operate. In particular, when the wireless communication device 1 is used in an vehicle-vehicle wireless communication system, as in this embodiment, the transmitter 5 is stopped and only the receiver 6 is permitted to operate, so that an output of illegal radio waves can be prevented and the vehicle information of a peripheral vehicle can be acquired. Meanwhile, the receiver 6 is stopped and only the transmitter 5 is permitted to operate, so that a peripheral vehicle can be notified of the existence of the subject vehicle.

When detecting abnormal oscillation despite stopping one of the transmitter 5 or receiver 6, the communication controller 4 turns off the power supply of the wireless communication device 1. Therefore, the abnormal oscillation can be prevented from continuing.

The communication controller 4 stops the transmitter 5 first when detecting abnormal oscillation in the transmission and reception waiting state. Therefore, an output of illegal radio waves due to the abnormal oscillation state can be swiftly stopped.

Second Embodiment

Figure 5:
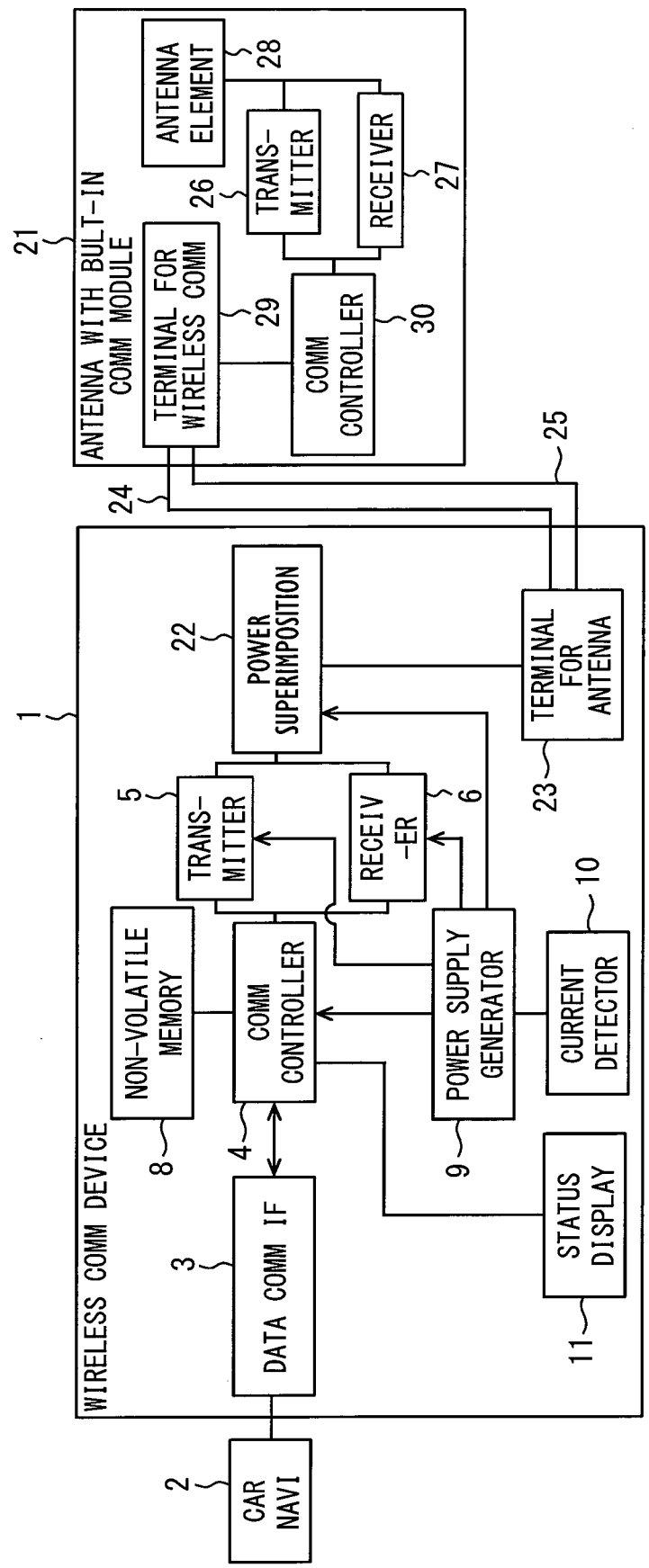
FIG. 5 is a functional block diagram illustrating a wireless communication device in a second embodiment.

Next, a second embodiment will be described with reference to FIG. 5. The same references are used to refer to the same configurations as in the first embodiment to omit redundant description. Different configurations will be described. In the second embodiment, a communication module embedded antennae, which has a built-in active element such as an amplifier module, is employed instead of the antenna 7 of the first embodiment.

A communication module embedded antenna 21 is connected to the wireless communication device 1. The wireless communication device 1 is of practically the same configuration as the wireless communication device 1 of the first embodiment, but includes a power supply superimposition unit 22 and an antenna connection terminal 23 as additional components. The power supply superimposition unit 22 superimposes direct current voltage, which forms a power supply for driving the communication module embedded antenna 21, onto a signal in a wireless frequency band. The antenna connection terminal 23 is a terminal for connecting with the communication module embedded antenna 21 via an antenna cable 24 and a control cable 25.

The communication module embedded antenna 21 includes a transmitter 26 with an unshown PA and the like, a receiver 27 with an LNA and the like, an antenna element 28, a wireless communication device connection terminal 29 connected via the antenna cable 24 and the control cable 25 to the antenna connection terminal 23 of the wireless communication device 1, and a communication controller 30 for controlling the transmitter 26 and the receiver 27. The communication controller 4 of the wireless communication device 1 can turn each of the transmitter 26 and the receiver 27 on and off via the control cable 25, the wireless communication device connection terminal 29, and the communication controller 30.

In this kind of configuration, amplifiers with high amplification factors, such as a PA and an LNA, are embedded in the communication module embedded antenna 21, because of which abnormal oscillation may occur in the communication module embedded antenna 21. Therefore, in the same way as in the first embodiment, the communication controller 4 of the wireless communication device 1 compares the current consumption value and the abnormal oscillation threshold in each operating state, thereby detecting abnormal oscillation.

Figure 4:
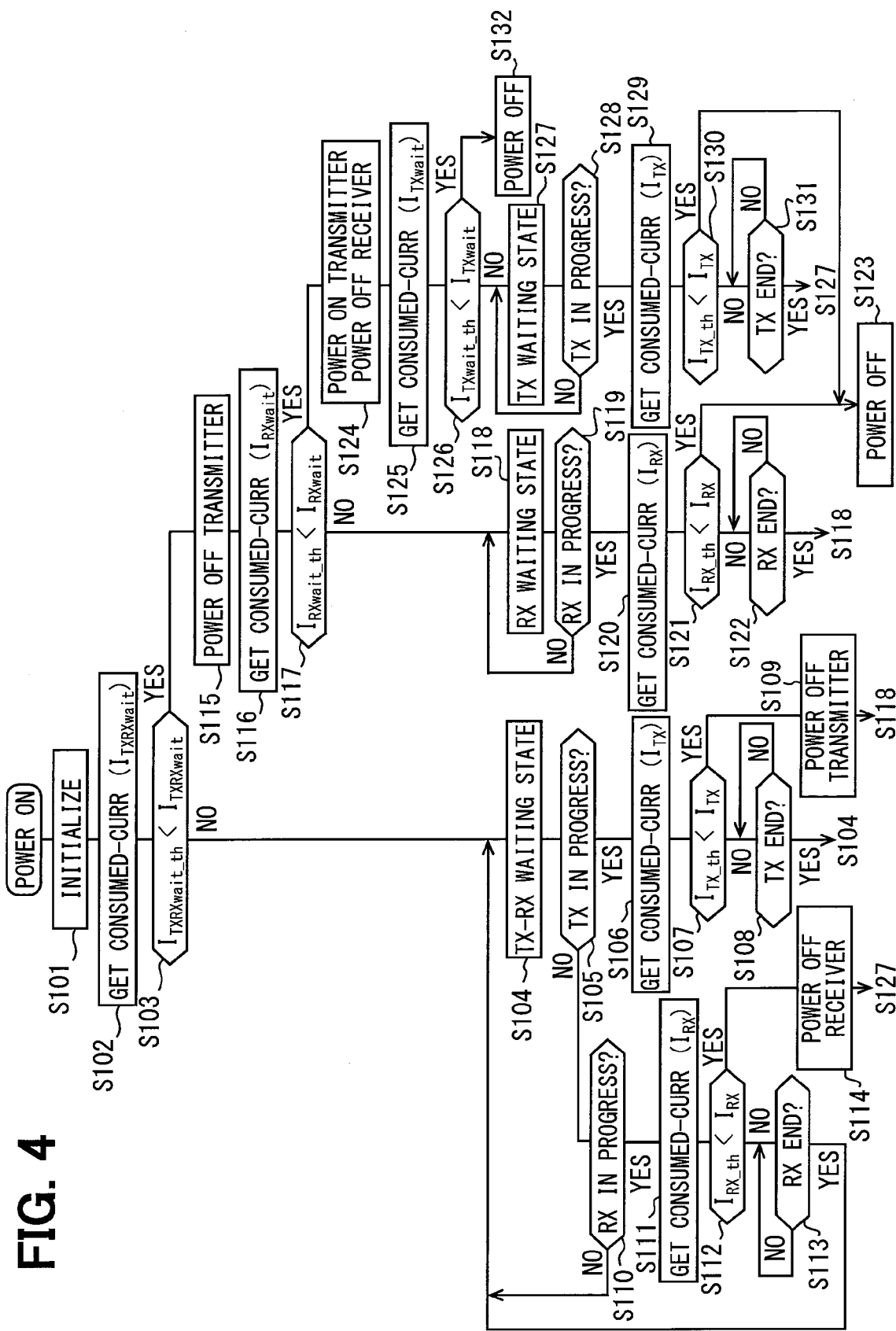
FIG. 4 is a flowchart illustrating an operation of detecting abnormal oscillation.

The operation of abnormal oscillation detection by the communication controller 4 is the same as the operation shown in FIG. 4. That is, the current consumption value of the communication module embedded antenna 21 is detected in the current detector 10 in the transmission and reception waiting state, and the presence or otherwise of abnormal oscillation is determined. When it is determined that abnormal oscillation is occurring, the communication controller 4 first turns off the transmitter 26, and in the event that no abnormal oscillation occurs, adopts a waiting state of only the receiver 27. When abnormal oscillation occurs even when the transmitter 26 is turned off, the communication controller 4 turns on the transmitter 26, and turns off the receiver 27. When no abnormal oscillation occurs, the communication controller 4 adopts a waiting state of only the transmitter 26. When abnormal oscillation occurs even when the receiver 27 is turned off, the communication controller 4 turns off the power supply of both the transmitter 26 and the receiver 27, thereby stopping the communication module-embedded antenna 21 itself.

According to this kind of embodiment, when abnormal oscillation is detected in the transmission and reception waiting state in the communication module-embedded antenna 21 connected to the wireless communication device 1, only one of the transmitter 26 and the receiver 27 without involving an occurrence of the abnormal oscillation is adopted as a waiting state enabled device, because of which the minimum necessary communication with another vehicle positioned in the periphery of subject vehicle can be secured.

As the wireless communication device 1 measures the current consumption of the communication module embedded antenna 21, it can be determined that the antenna cable 24 between the wireless communication device 1 and the communication module-incorporated antenna 21 is disconnected when the current consumption is zero, because of which disconnection can also be detected.

(Modifications)

The heretofore described embodiments do not limit the invention and can be modified or expanded in the following ways.

In the embodiments, the power supply of the transmitter 5 and the receiver 6 is turned on and off by the communication controller 4, but a power supply controller may be provided for turning the power supply of the transmitter 5 and the receiver 6 on and off.

The external apparatus connected to the wireless communication device 1 may be an ECU (electronic control unit) mounted in the vehicle.

The wireless communication device may be a wireless communication device for a road-to-vehicle wireless communication system, wireless LAN, or portable base station connection.

Heretofore, embodiments and configurations according to the present disclosure have been illustrated but embodiments and configurations according to the present disclosure are not limited to the above illustrated embodiments and configurations. Embodiments and configurations obtained by appropriately combining technological components disclosed in differing embodiments and configurations are also included in embodiments and configurations according to the present disclosure.

What is claimed is:

1. A wireless communication device comprising:
    a communication controller that controls signal transmission and reception in wireless communication;
    a transmitter that modulates and power-amplifies a signal from the communication controller;
    an antenna that communicates with an exterior in a wireless frequency band;
    a receiver that power-amplifies and demodulates a signal in the wireless frequency band received by the antenna and outputs the power-amplified and demodulated signal to the communication controller;
    a power supply generator that supplies power to the communication controller, the transmitter, and the receiver;
    a current detector that detects a current consumption value of the power supply generator;
    a non-volatile memory in which a plurality of current thresholds corresponding to a plurality of operating states of the wireless communication device are pre-stored; and
    an abnormal oscillation detector that detects abnormal oscillation by comparing the current consumption value acquired from the current detector and a current threshold corresponding to a present operating state of the wireless communication device out of the current thresholds stored in the non-volatile memory,
    wherein:
        when the abnormal oscillation detector detects the abnormal oscillation, the communication controller executes a first process in which the communication controller stops only one of the transmitter and the receiver and once again compares the current consumption value acquired from the current detector and the current threshold corresponding to the present operating state of the wireless communication device out of the current thresholds stored in the non-volatile memory; and
        when no abnormal oscillation is occurring according to a result of the first process, the communication controller maintains the other of the transmitter and the receiver in operation.

2. The wireless communication device according to claim 1, wherein:
    when the abnormal oscillation is occurring according to the result of the first process, the communication controller executes a second process in which the communication controller causes only the stopped one of the transmitter and the receiver to operate and once again compares the current consumption value acquired from the current detector and the current threshold corresponding to the present operating state of the wireless communication device out of the current thresholds stored in the non-volatile memory; and
    when no abnormal oscillation is occurring according to the result of the second process, the communication controller maintains only the one of the transmitter and the receiver in operation.

3. The wireless communication device according to claim 1, wherein:
    when the abnormal oscillation detector detects the abnormal oscillation, the communication controller stops only the transmitter in the first process.

4. The wireless communication device according to claim 1, further comprising
    a status display for displaying the transmitter and the receiver in operation, wherein
    the communication controller displays whether any of the transmitter and the receiver is in operation on the status display.

5. The wireless communication device according to claim 1, wherein
    a transmission and reception waiting state abnormal oscillation threshold corresponding to a transmission and reception waiting state, a transmission waiting state abnormal oscillation threshold corresponding to a transmission waiting state, a reception waiting state abnormal oscillation threshold corresponding to a reception waiting state, a transmission time abnormal oscillation threshold, and a reception time abnormal oscillation threshold are stored in the non-volatile memory as the plurality of current thresholds.

6. The wireless communication device according to claim 1, wherein
    the wireless communication device connects a communication module embedded antenna that has, as built-in components, the transmitter and the receiver.

* * * * *